United States Patent [19]

Heil

[11] Patent Number: 5,246,549
[45] Date of Patent: Sep. 21, 1993

[54] VACUUM DISTILLATION SYSTEM UTILIZING LOOSE POLYMER LINING

[76] Inventor: John Heil, P.O. Box 1361, Pascagoula, Miss. 39567

[21] Appl. No.: 758,261

[22] Filed: Aug. 26, 1991

Related U.S. Application Data

[63] Continuation of Ser. No. 550,809, Jul. 10, 1990, abandoned, which is a continuation of Ser. No. 366,448, May 15, 1989, abandoned.

[51] Int. Cl.⁵ ............................................. B01D 3/10
[52] U.S. Cl. ............................... 203/2; 159/DIG. 15; 159/DIG. 16; 159/DIG. 19; 159/DIG. 28; 159/DIG. 27; 202/205; 202/237; 202/266; 202/267.1; 203/86; 203/91
[58] Field of Search ........................ 203/86, 91, 7, 2; 73/864.02, 864.52; 202/205, 266, 267.1, 160, 237; 159/DIG. 16, DIG. 15, DIG. 19, DIG. 28, DIG. 27

[56] References Cited

U.S. PATENT DOCUMENTS

| | | | |
|---|---|---|---|
| 1,881,041 | 10/1932 | Benjamin | 203/86 |
| 3,207,358 | 9/1965 | Fliss | 219/312 |
| 3,929,537 | 12/1975 | Erwin | 428/467 |
| 3,933,575 | 1/1976 | Guth et al. | 203/86 |
| 3,985,511 | 10/1976 | Betts | 219/312 |
| 4,119,485 | 10/1978 | Erwin | 203/86 |
| 4,164,441 | 8/1979 | Kühnlein et al. | 159/24.2 |
| 4,620,900 | 11/1986 | Kimura et al. | 203/86 |
| 4,693,786 | 9/1987 | Brett et al. | 203/86 |
| 4,865,014 | 9/1989 | Nelson | 219/312 |

FOREIGN PATENT DOCUMENTS 2928598 1/1981 Fed. Rep. of Germany ........ 203/86

OTHER PUBLICATIONS

Dabeka et al., "Polypropylene for the sub-boiling Distillation and storage of High-Purity Aids & H₂O".

Primary Examiner—Virginia Manoharan

[57] ABSTRACT

An apparatus for distilling corrosive compounds under high temperatures, which would include primary vessel chamber, having a first interior annular wall lined with a loose polymer, such as PTFE (or TEFLON), a second annular wall exterior to the first annular wall, and defining an annular space between the interior and the exterior wall; a somewhat rigid porous material for supporting the interior PTFE liner positioned along the interior wall of the vessel; device for drawing air out of the annular space between interior and exterior walls, for creating a vacuum at the annular space, so that the PTFE liner is supported firmly against the somewhat rigid porous support member; next, a second means for drawing air out of the interior of the vessel for creating a vacuum therewithin so that a pressure equilibrium is established between the interior of the vessel and the annular space, and a corrosive material can be heated in the vessel chamber under the vacuum, and the liner be maintained flush against the wall of the vessel.

16 Claims, 3 Drawing Sheets

VACUUM DISTILLATION SYSTEM UTILIZING LOOSE POLYMER LINING

This is a continuation of application Ser. No. 07/550,809 filed on Jul. 10, 1990, abandoned, which is a continuation of application Ser. No. 07/366,448, filed May 15, 1989, abandoned.

BACKGROUND OF THE INVENTION

1. Field of the Invention

The system of the present invention relates to distillation systems. More particularly, the present invention relates to a distillation system utilizing a loose polymer lining in a distillation vessel, piping and exchangers so that fluids may be distilled under vacuum, and the lining maintained against the wall of the vessel through a pressure differential from a second vacuum created around the outer lining wall.

2. General Background

The development of loose polymer-lined steel vessels, piping and exchangers has provided the chemical industry with valuable chemically inert materials of construction with improved economics over glass lined and exotic metal equipment, which are the alternatives for processing highly corrosive or very reactive compounds. The most widely used polymers are polyethylene, polypropylene, rubber and polytetrafluoroethylene (PTFE) more commonly known as TEFLON, which is a registered trademark of Dupont. TEFLON lined equipment is generally preferable over other polymers due to the much higher temperature limits and almost complete inertness of TEFLON to other chemicals. The exception to this inertness would be hydroflouric acid and metallic sodium. The typical type metals which would be required to handle similar operations are metals such as tantalum, titanium and zirconium. Nickel and chromium are also utilized. Glass-lined steel equipment is probably the oldest alternative but does not provide the full range of chemical inertness. Glass lined vessels are also very fragile requiring high costs of maintenance.

In the utilization of a TEFLON-lined vessel, loose polymer-lined steel utilizes a weep hole somewhere in the steel jacket for allowing entrapped air to escape, which would place the polymer-liner under atmospheric pressure or approximately 15 psi. Without the weep hole, entrapped air could expand and collapse the lining resulting in flow restriction or stoppage. The liner would generally tear and therefore would have to be replaced when collapse occurs.

A similar problem would develop when the interior liner pressure is reduced to sub-atmospheric levels. The liner would pulsate and collapse as vacuum is increased inside the liner. As operating temperatures are increased, the liner's physical strength deteriorates rapidly and collapse occurs at much smaller pressure differentials. As a consequence, the use of loose polymer lined steel equipment has not been possible in systems operated under vacuum. There is the ability to firmly bind the polymer liner to steel vessels so that operation in the vacuum is possible, but not suitable for high temperature uses, and in a very limited area.

An additional value of loose-lined polymer systems capable of vacuum operations lies in the ability to process chemicals at the much lower temperatures that vacuum distillation would allow. This capability would broadly increase the range of use for TEFLON-lined equipment since it is temperature limited in the range of under 430° F. A typical example in common practice would be the ability to concentrate sulfuric acid to 93% in TEFLON lined equipment. The atmospheric boiling point is 530° F. whereas the boiling point at full vacuum is under 270° F. Therefore, in boiling under full vacuum, the distillation and reconcentration of the sulfuric acid could take place in the polymer lined vessel which would be beneficial due to its inertness, and ability to withstand this temperature. Several patents were found in the art which addressed the question of fluid sampling apparatus's having a lining, the most pertinent being as follows:

| PATENT NO. | TITLE | INVENTOR |
|---|---|---|
| 2,223,785 | GAS SAMPLING SYSTEM | G. L. Hassler |
| 2,645,940 | SNAP SAMPLER | J. Kohl et al. |
| 3,635,092 | MANUALLY OPERATED GAS SAMPLER | Maughan et al. |
| 3,866,474 | GAS SAMPLE COLLECTING DEVICE | Hasselmann |
| 4,008,621 | METHOD AND APPARATUS FOR SAMPLING GAS | Ostojic et al. |
| 4,635,487 | FLUID SAMPLER | Gowing |

SUMMARY OF THE PRESENT INVENTION

The apparatus and system of the present invention would solve the problems confronted in the art in a simple and straightforward manner. What would be provided is a vessel for distilling corrosive compounds under high temperatures, which would comprise primary vessel chamber, piping and heat exchanger having a first interior annular wall lined with a loose polymer, such as PTFE (or TEFLON), a second annular wall exterior to the first annular wall, and defining an annular space between the interior and the exterior wall; a somewhat rigid porous material for supporting the interior PTFE liner positioned along the interior wall of the vessel; means for drawing air out of the annular space between interior and exterior walls, for creating a vacuum at the annular space, so that the PTFE liner is supported firmly against the somewhat rigid porous support member; next, a second means for drawing air out of the interior of the vessel for creating a vacuum therewithin so that a pressure differential is established between the interior of the vessel and the annular space, and a corrosive material can be heated in the vessel chamber under the vacuum, and the liner be maintained flush against the wall of the vessel.

Therefore, it is the principal object of the present invention to provide a system which would include a primary vessel for boiling corrosive materials under a vacuum, while utilizing a substantially inert vessel liner remaining in place during the process, and the system further including a piping system and heat exchangers including inert liners held in place under a vacuum as the corrosive material is transported throughout the system.

It is a further object of the present invention to provide a vessel for boiling corrosive compounds under vacuum, while utilizing a loose, substantially inert vessel liner maintained in position along the interior vessel wall by a pressure differential between the interior chamber and exterior space surrounding the liner.

It is still a further object of the present invention to provide a method for maintaining a loose inert vessel liner in position around the interior wall of the vessel while a compound is being boiled under vacuum within the vessel to avoid collapse of the liner as the vacuum is maintained within the vessel.

BRIEF DESCRIPTION OF THE DRAWINGS

For a further understanding of the nature and objects of the present invention, reference should be had to the following detailed description, taken in conjunction with the accompanying drawings, in which like parts are given like reference numerals, and wherein.

DETAILED DESCRIPTION OF THE PREFERRED EMBODIMENT

Figure 1:
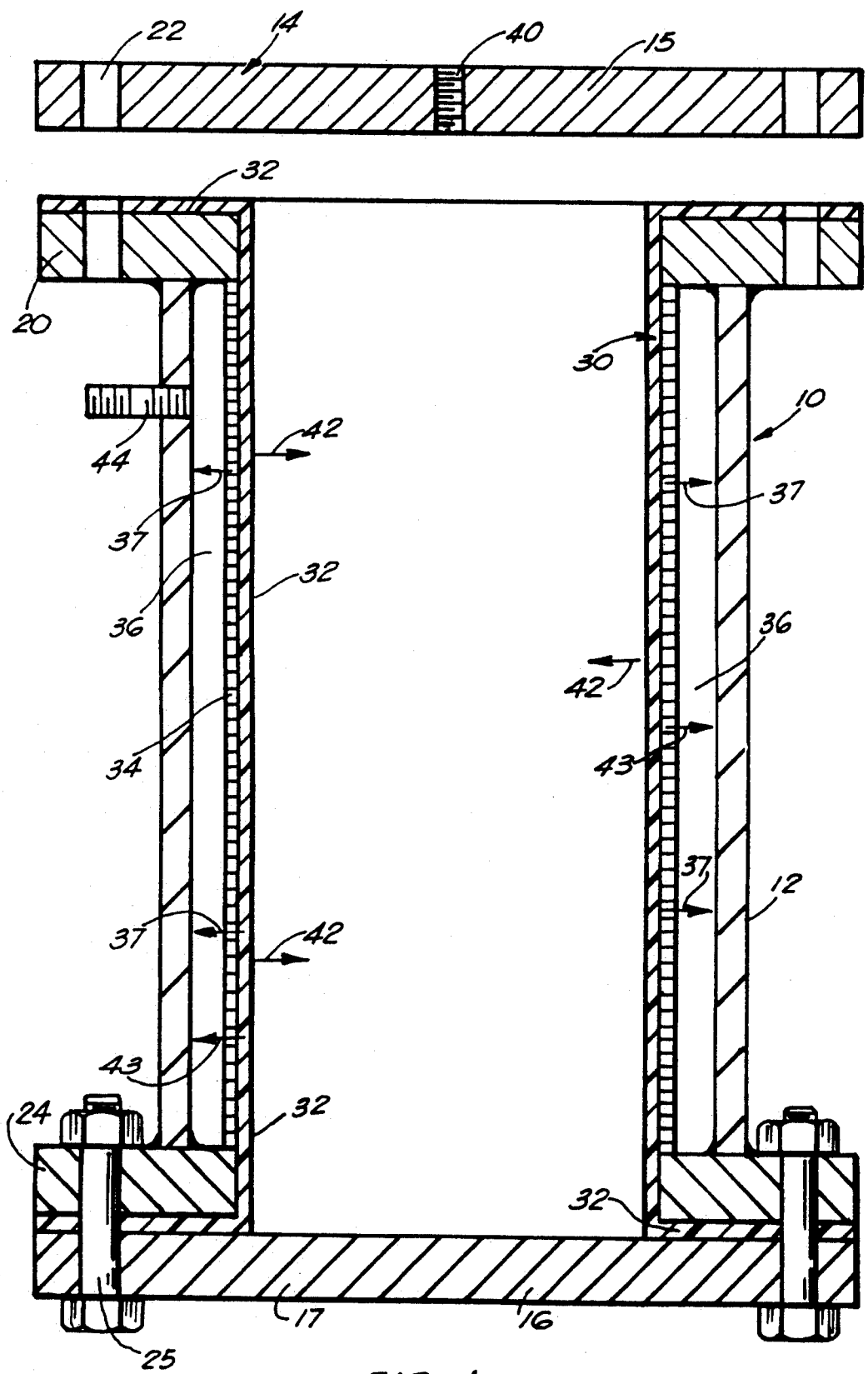
FIG. 1 illustrates an cross-sectional view of the preferred embodiment of the vessel of the present invention.
Figure 2:
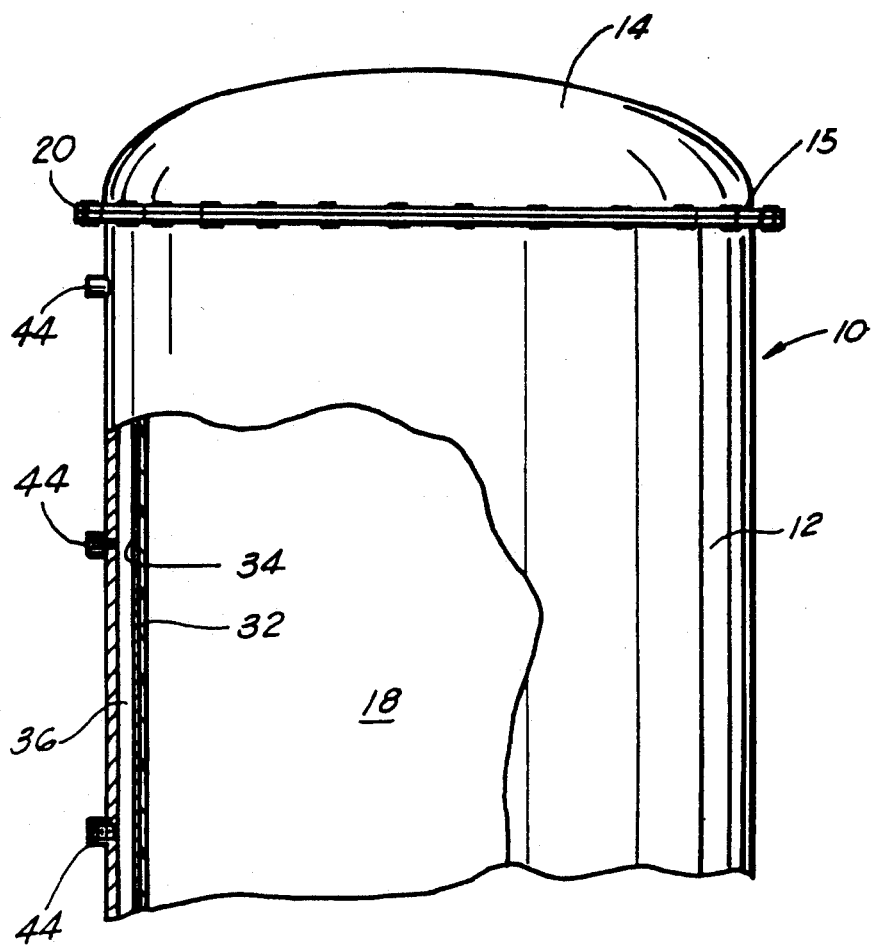
FIG. 2 illustrates a partial overall cut-away view of the vessel utilized in the preferred embodiment of the present invention.
Figure 3:
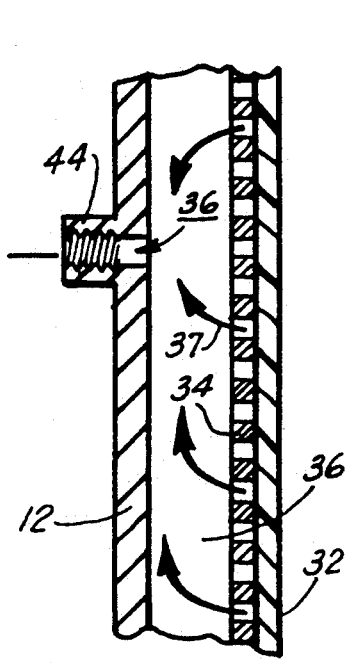
FIG. 3 illustrates an isolated view of the wall configuration of the vessel of the present invention.
Figure 4:
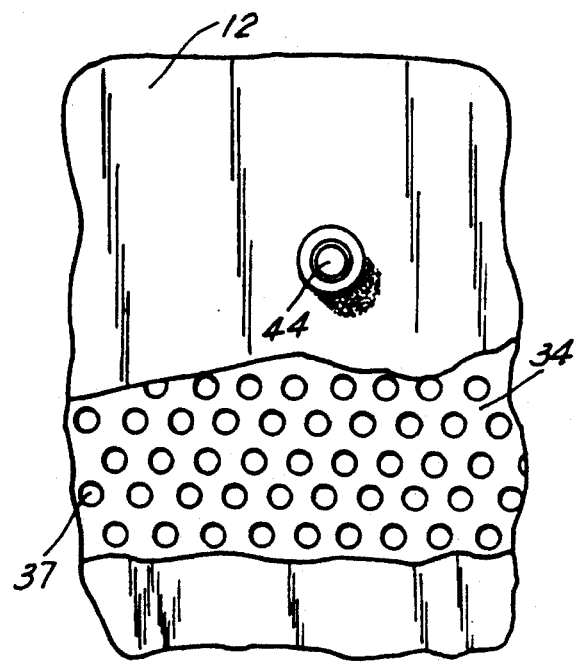
FIG. 4 illustrates a partial cut-away front view of the wall of the vessel of the present invention.
Figure 5:
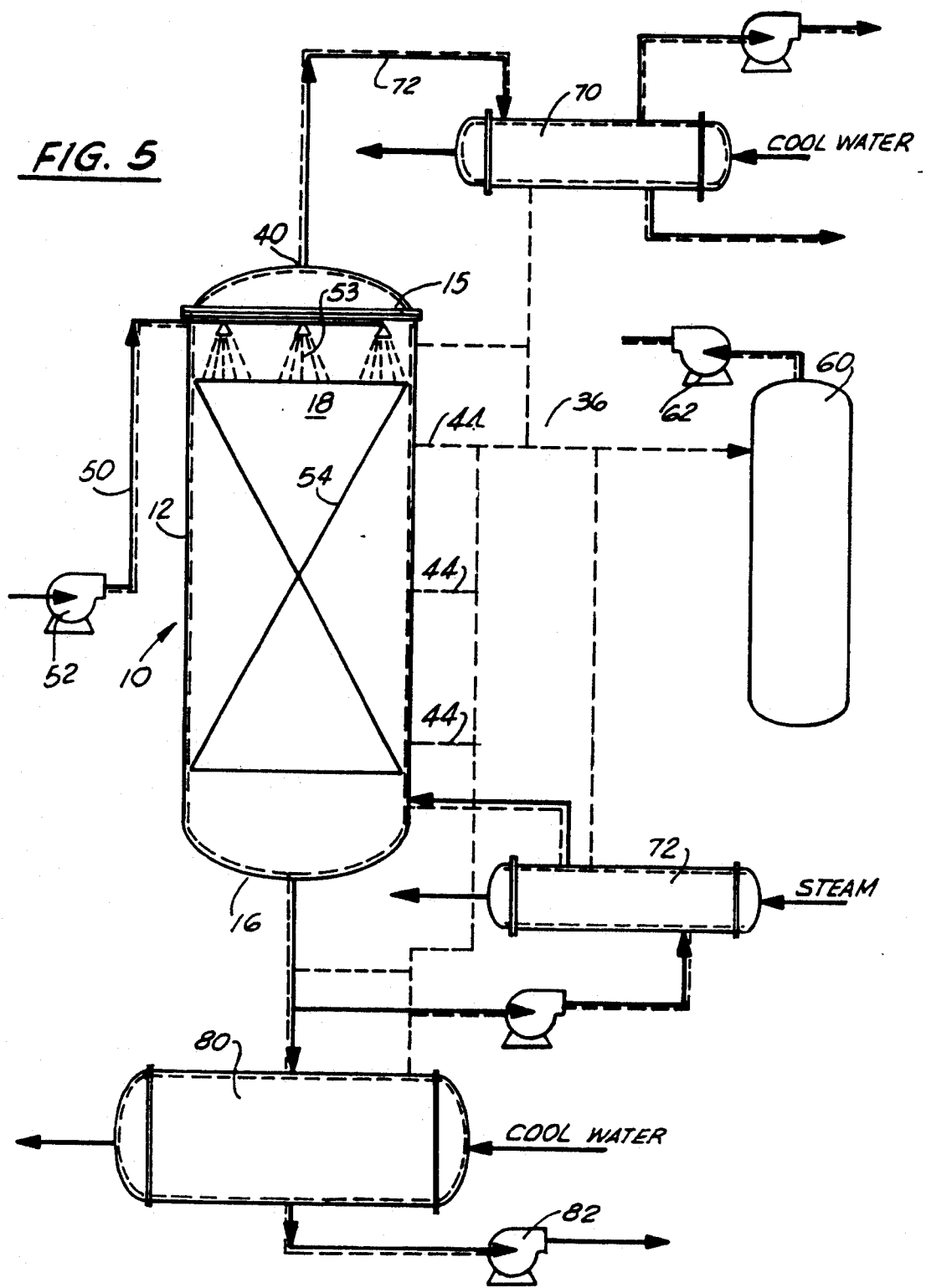
FIG. 5 illustrates a view of the system in which the vessel of the preferred embodiment of the present invention is utilized.

The preferred embodiment of the apparatus of the present invention is illustrated in FIGS. 1-4, with the system illustrated in FIG. 5. As illustrated in FIGS. 1-4 in the preferred embodiment, vessel 10 would be cylindrical in nature, having an annular continuous side wall 12, a top portion 14, and a lower portion 16, the annular wall 12, top portion 14, and lower portion 16 defining a substantial closed vessel space 18 therewithin, wherein tests or distilling or other treatments of corrosive compounds may take place under vacuum as will be discussed further. For purposes of the preferred embodiment, vessel 10 is illustrated as having a continuous annular side wall 12, but vessel 10 may be constructed in any configuration although the cylindrical shape illustrated in FIG. 2 is the preferred shape.

Reference will be made to FIG. 1, wherein the vessel is illustrated in cross-section view, and is illustrated with top portion 14 and bottom portion 16 being removable. For illustration purposes, this will be discussed in detail. However, vessel 10 may be a single closed vessel as illustrated in FIG. 2 in partial view and FIG. 5. In either embodiment, the construction and functioning of the vessel will be identical. Therefore, a complete discussion of the vessel will initially be had in regard to FIG. 1.

Turning now to FIG. 1, there is illustrated in vessel 10, wherein the vessel space 18 is defined by the removable top end portion 14 which is illustrated as a blind flange member 15, which can be bolted to an upper annular shoulder portion 20 atop wall 12 of vessel 10, through a continuous bolt bore 22 to secure blind flange 15 in place sealed against shoulder 20 of vessel 10. Likewise, there is illustrated at the bottom of vessel 10 an additional lower blind flange 17, which likewise, would bolt onto lower shoulder 24 of vessel wall 12, via bolts 25, and would be secured in place, for defining the enclosed interior 18 of vessel 10 during use. Vessel 10 would further comprise an interior annular wall 30, which would comprise initially an interior layer of loose flexible polymer 32 such as PTFE (or TEFLON), which would completely line the interior of vessel space 18 as illustrated in cross-section in FIG. 1. For purposes of sealing, liner 32 would fold over and would be held in place between the blind flanges 14, 16, and the upper shoulder 20 and lower shoulder 24 of the vessel, to insure that the vessel would be completely sealed with liner 32. For purposes of construction, liner 32 would be a shell approximately 60 to 90 Mils. in thickness for use. Since liner 32 is a flexible material, vessel 10 would further comprise an outer rigid support means, shell 34, which would be a perforated member (as seen in FIG. 4) having a plurality of ports 37 therethrough, which in the preferred embodiment would comprise approximately fifty percent of the area of shell 34 completely surrounding the exterior surface of PTFE liner 32. Shell 34 would be, in the preferred embodiment a perforated screen, which would have sufficient rigid support for supporting liner 32 during use.

For purposes of description, the liner utilized in the preferred embodiment would be a TEFLON liner. However, it should be noted that other flexible liners may be utilized such as inert metals, or rubber liners, or any liner which could withstand the heat necessary in the present invention.

As further illustrated in the FIGURES, there would be an annular area 36 between outer perforated liner 34 and the outer shell 12 of vessel 10, that would define an annular space 36 completely surrounding the interior of liner 30, the purpose of which will be defined further.

As was discussed earlier, vessel 10 will be utilized to distill corrosive fluids under a vacuum. Therefore, as seen in the FIGURES, upper flange 15 would be provided with a vacuum tap 40, so that a vacuum line would be threadably engaged into tap 40, and any air contained within space 18 would be pulled from space 18 creating a vacuum therewithin. However, any vacuum which would be pulled within space 18 would naturally affect flexible liner 32, and may cause liner 32 to move inwardly towards the interior 18 as illustrated by the arrows 42. In order to solve this problem, there is further provided a second vacuum tap 44 within the outer wall 12 of vessel 10, vacuum tap 44 again pulling air from within the annular space 36 between outer wall 12 and support screen 34. Therefore, as the vacuum is pulled from annular space 36, naturally, a force is provided against the interior liner 32 outwardly towards the annular space 36 as seen in FIG. 3 in the direction of arrow 37. Therefore, as the interior vacuum is pulled within space 18 and liner 32 is inclined to collapse within space 18, likewise a prior vacuum is pulled within annular space 36 via tap 44, and therefore liner 32 is equally inclined to expand outward in the direction of arrows 43, and therefore a pressure differential is created between the interior vacuum in space 18 and the vacuum within space 36, and therefore liner 32 maintained in place during operation.

In the preferred embodiment, so as to avoid the collapse of liner 32, during the sequence of pulling the vacuums in the system, it is preferred that the vacuum in the annular space 36 be pulled initially, so that the liner is secured against the screen 34 via the vacuum in annular space 36. After that vacuum has been established, the vacuum can be established within the interior 18 of vessel 10, so that the necessary testing and/or installation may take place within vessel space 18. In this manner, it is assured that the liner will be maintained in position against screen 34 prior to any vacuum being pulled within space 18 so as to avoid any potential collapse of the liner during the establishing of the vacuums.

As illustrated in the FIGURES, due to the fact that the exterior support screen 34 is provided with the plurality of ports 37 in sufficient number to comprise approximately fifty percent of the area of support screen 34, sufficient vacuum within space 36 will impart an equally consistent pull throughout the entire outer surface of interior liner 32, and therefore maintain it in position along the entire annular surface of screen 34 during the process.

As is illustrated in FIG. 2, there may be provided a plurality of vacuum taps 44 along the length of vessel 10 due to the fact depending on the size of the vessel, a vacuum may have to be placed at different points along the length of the vessel so as one is assured that the entire annular space 36 around the vessel lining is provided with sufficient vacuum to exceed the vacuum within space 18 during use.

Although FIGS. 1-4 illustrated the principal vessel 10 utilized in the system of the present invention, vessel 10 is part of an overall system as is illustrated in FIG. 5 and will be discussed hereinafter. It should be understood that in order for vessel 10 to be operated under the pressure differential between the chamber 18 and the annular space 36, this pressure differential must be maintained throughout the entire system as the product moves from vessel 18 into the system as seen in FIG. 5. Therefore, it is the intent that the structural components of vessel 10, i.e., the outer sidewall 12, the perforated interior wall and liner 32 which define annular space 36 therebetween would be found throughout the entire system where a pressure differential must be maintained in the system.

As illustrated in FIG. 5, in all portions of the flow diagram as illustrated, that portion of the flow diagram requiring a pressure differential in place as described in chamber 18, is represented by both a solid line to indicate the travel of the product, and a corresponding phantom line to indicate the presence of the vacuum within the system. Single phantom lines are for vacuum only.

Turning now to the system as illustrated in FIG. 5, there is illustrated the primary vessel 10 which is being fed with the non-concentrated acid feed line 50 from a pump 52. The acid feed line feeds a spray of acid 53 into the vessel space 18, where in the vessel may incur packing material 54 within the interior space 18. Vessel 10, of course, as illustrated to be the identical vessel as illustrated in FIGS. 1 and 2, and would have the components as previously discussed. The system would include a vacuum surge tank 60, which would maintain a vacuum within tank 60 via a pump 62, through line 63 which would pull the various vacuum taps 44 within the wall 12 of vessel 10 as was discussed earlier. The critical points in the operation is to assure that as a vacuum is maintained within the interior 18 of tank 10 through vacuum tap 40, that a greater vacuum be maintained within the annular space 36 along the length of tank 10. Should the vacuum be lost within annular space 36, liner 32 would in all likelihood collapse, and the system would have to shut down, and the vessel completely reconstituted in order to equip the vessel with a new liner.

Therefore, in order to avoid this unwanted occurrence, surge tank 60 would monitor the vacuum within space 36 and maintain the vacuum at the necessary amount in order to maintain the pressure differential within chamber 18 and maintain the liner securely in place. As illustrated, the system further comprises a condenser 70 for receiving and condensing the distilled water via line 72, a heater 72 for maintaining the temperature within the vessel at the required temperature in order to distill whatever fluid is being distilled within the vessel during treatment. There is further provided cooling vessel 80, which will cool the distilled liquid such as acid and pump it out via pump 82 in its pure product form. The system is simply being illustrated to place the vessel in its operation in the proper context, but it is not critical to the operation of the overall invention. The overall apparatus and method of the present invention could be utilized in various types of systems, but due to its unique ability to maintain a loose liner within the confines of a vessel pipes and exchangers being operated under a vacuum, it would therefore allow the utilization of this type of vessel in many modes of operation and uses, and would allow a greater range of safe and accurate distillation of corrosive fluids in various industries.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A process for distilling corrosive fluids under vacuum, comprising the following steps:
   a) introducing the fluids to be distilled in a primary vessel chamber having a first annular outer wall;
   b) providing a loose, inert interior liner, positioned within the vessel chamber for defining a fluid distillation space therewithin;
   c) supporting the loose, inert flexible interior liner within the vessel chamber by a porous support means, the vessel further defining an annular space between the support means and the annular outer wall;
   d) sequentially pulling a vacuum initially within the annular space between the interior liner and the outer annular wall of the vessel to cause the inert, liner to be maintained against the means for supporting the liner;
   e) next, pulling a vacuum within the distillation space defined by the interior liner to establish a pressure differential between the annular space and the distillation space;
   f) distilling fluids in the distillation space while there is a pressure differential between the fluid distillation space and the annular space between the inert liner and the outer annular wall of the vessel, monitoring the vacuum within the annular space to maintain the pressure differential so to prevent the liner from collapsing; condensing and removing the distilled product through a piping system from the vessel.

2. The process in claim 1, wherein the vacuum pulled within the annular space is an absolute vacuum.

3. The process in claim 1, wherein there is established an equilibrium within the piping system.

4. A system for distilling corrosive fluids under vacuum, the system comprising a primary vessel, piping, and heat exchangers, at least the primary vessel further comprising:
   a) a primary vessel chamber having a first exterior outer wall;

b) a loose, inert interior liner, defining a vessel space therewithin;

c) a support surface positioned between the outer wall of the primary vessel chamber and the interior liner for supporting the interior liner, and spaced apart from the outer wall for defining an annular space between the outer wall and support surface;

d) a plurality of ports in the support surface for communicating with the interior liner;

e) means for initially establishing a vacuum throughout the annular space between the outer wall and the interior liner;

f) means for establishing a vacuum within the vessel space defined by the interior liner for maintaining the interior liner supported against the support surface as a pressure differential is maintained between the vessel space and the annular space while fluid is undergoing distillation in the vessel.

5. The vessel in claim 4, wherein the inert interior liner comprises polytetrafluoroethylene (PTFE).

6. The vessel in claim 4, wherein the vacuum is established in the annular space by the drawing out of air within the annular space through a vacuum tap.

7. The vessel in claim 4, further comprising means for establishing the vacuum in the vessel space following the establishing of the vacuum in the annular space.

8. The vessel in claim 4, wherein the plurality of ports on the support surface comprise approximately 50% of the entire area of the support surface.

9. The vessel in claim 4, wherein the liner comprises a metal.

10. An apparatus for distilling corrosive fluids under a vacuum comprising:

a) a primary vessel chamber having a first exterior annular outer wall;

b) a loose, inert liner, positioned within the primary vessel, and defining a fluid distillation space therewithin;

c) a support surface positioned within the vessel chamber, and the loose, inert liner, the rigid support surface defining an annular space between the liner and the exterior annular outer wall;

d) a plurality of ports covering at least 50% of the support surface for communicating with the liner;

e) means for pulling a vacuum within the annular space between the rigid support surface and the annular surface of the outer wall of the vessel so that the inert liner is formed against the support surface as a result of the vacuum in the annular space; and f) means for pulling a vacuum within the vessel chamber space defined by the inert liner, the vacuum within the interior of the vessel chamber, and the vacuum within the annular space establishing a pressure differential between the interior of the vessel chamber and the annular space so that the loose inert liner is maintained in a supported position against the support surface while fluid in the chamber vessel is being distilled under vacuum.

11. The apparatus in claim 10, wherein the loose inert liner is non-porous under normal operating conditions.

12. The apparatus in claim 10, wherein the loose inert liner is polytetrafluoroethylene (PTFE), rubber, or a metal.

13. The apparatus in claim 10, further comprising a piping system under vacuum for receiving the distilled fluids flowing from the vessel.

14. The apparatus in claim 10, wherein the liner is polytetrafluoroethylene or metal.

15. The vessel is claim 10, wherein the liner comprises polytetrafluoroethylene.

16. The apparatus in claim 10, wherein the pressure in the annular space is zero pounds per square inch.

* * * * *